Feb. 6, 1962     I. K. DORTORT     3,020,415
CURRENT BALANCING REACTORS
Filed April 23, 1959     2 Sheets-Sheet 1
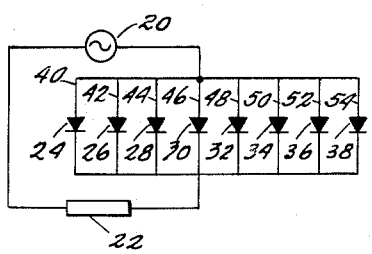
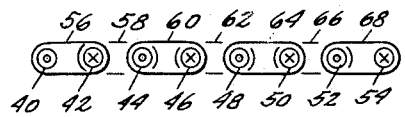
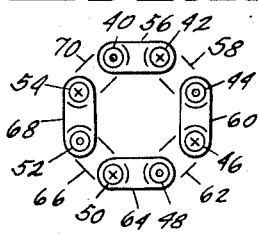
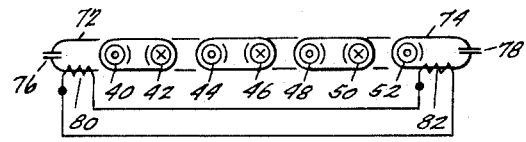
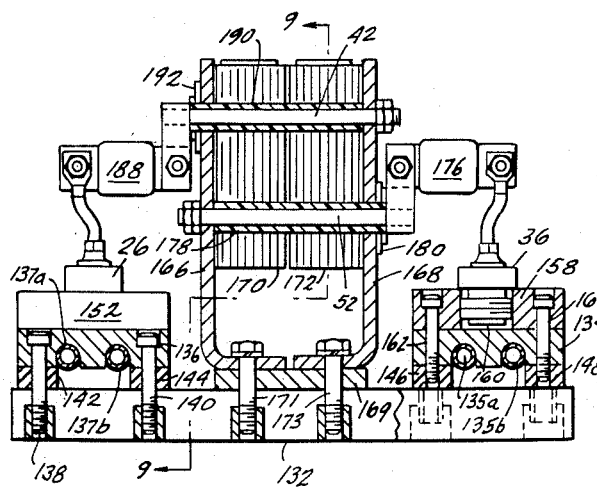
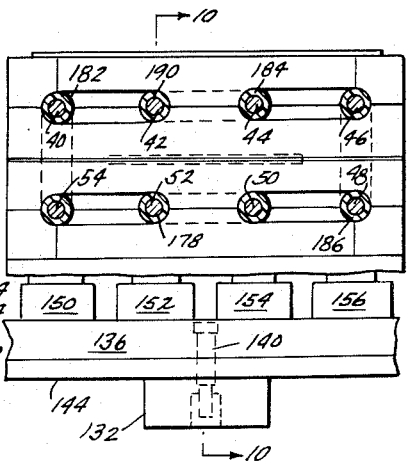
INVENTOR.
ISADORE K. DORTORT
BY Ostrolenk, Faber,
Gerb & Soffen
ATTORNEYS Feb. 6, 1962    I. K. DORTORT    3,020,415
CURRENT BALANCING REACTORS
Filed April 23, 1959    2 Sheets-Sheet 2
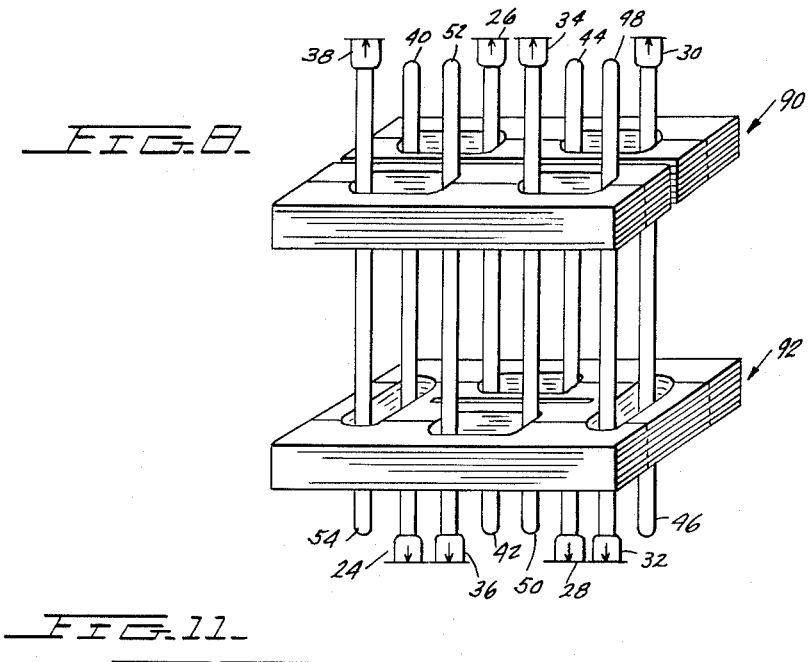
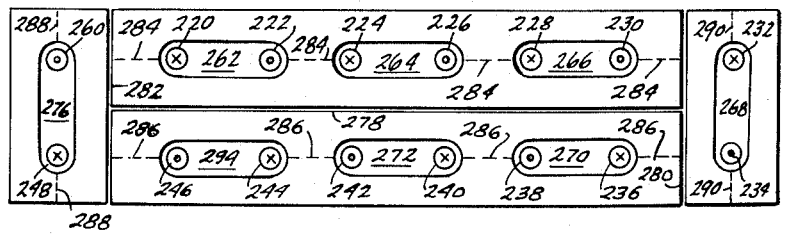
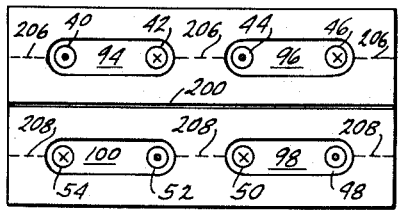
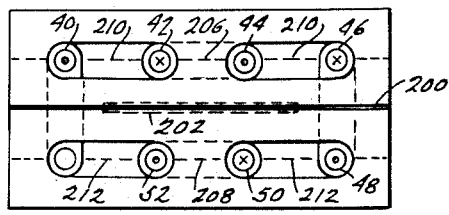
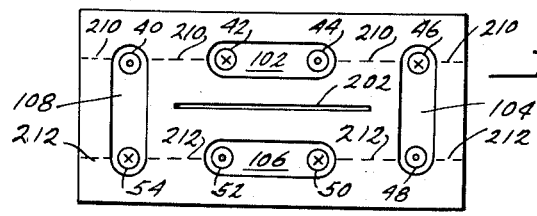
INVENTOR.
ISADORE K. DORTORT
BY
ATTORNEYS

United States Patent Office 3,020,415
Patented Feb. 6, 1962

3,020,415
CURRENT BALANCING REACTORS
Isadore K. Dortort, Philadelphia, Pa., assignor to I-T-E Circuit Breaker Company, Philadelphia, Pa., a corporation of Pennsylvania
Filed Apr. 23, 1959, Ser. No. 808,501
12 Claims. (Cl. 307—58)

My invention relates to balancing reactors for parallel connected diodes, and is a continuation in part application of my copending application Serial No. 732,868, filed May 5, 1958, now Patent No. 2,945,961, entitled "Current Balancing Reactors for Diodes," and assigned to the assignee of the present invention.

The above noted copending application Serial No. 732,868 describes a system for balancing the current between a plurality of parallel connected diodes by coupling each pair of adjacent diodes with a common reactor core. Since there may be as many as twenty or more parallel connected rectifiers to be coupled, it was found that the use of individual coupling reactors leads to an extremely complex and expensive system. Therefore, the above application shows how a plurality of individual coupling reactors can be replaced by a single stack of flat stamped magnetic laminations having apertures in registry with each of the diode conductors to be coupled where a first portion of the laminations of the stack couple a given diode conductor with a first adjacent diode and a second portion of the laminations couple the same diode with a second adjacent diode. In this manner, each pair of adjacent diodes of a parallel connected group will be coupled by a magnetic path in the same manner as if individual coupling reactors were used. Furthermore, by appropriately designing the laminations, an open or closed chain of coupling reactors can be formed. Furthermore, the lamination may have two parallel rows of apertures so that the length of the lamination is reduced. If required, the stack can be supported from the main current carrying bus work.

I have found that the characteristics of the reactor of the above noted application can be improved and the current difference between adjacent diodes decreased by putting small air gaps in the laminations to prevent local saturation of the lamination iron, and to reduce the residual magnetization. That is to say, the iron path of the lamination which joins adjacent diodes is provided with a cut or non-magnetic insert to increase the reluctance of the path.

It is obvious that the effective length of air gap must be kept very small, since a large air gap would require a large increase in cross-section and weight of core. One way to obtain small air gaps is by very careful stacking and grinding of the butt joint. This is an expensive operation. A much easier and less expensive way is to provide an ordinary air gap in only a percentage of the laminations, uniformly distributed throughout a stack of laminations without air gaps.

For still smaller effective gap requirements, it has been found sufficient in some cases to depend only on the increased reluctance provided by the cross-grain flow of flux in part of a magnetic loop in oriented steel.

Where the apertures lie in two parallel lines, the lines may be separated by a substantial air gap so that only the consecutively adjacent diode conductors of the chain operate on one another and the diode conductors of one line do not affect the diode conductors of the other line.

Accordingly, the primary object of my invention is to provide a novel current balancing reactor for parallel connected diodes.

Another object of my invention is to provide a current balancing reactor formed of a laminated stack of iron having apertures therein for receiving parallel connected diode conductors wherein the magnetic circuit for various adjacent diode conductors have air gaps therein.

These and other objects of my invention will become apparent from the following description when taken in conjunction with the drawings in which:

FIGURE 1 shows a rectifier circuit having a plurality of parallel connected diodes.

FIGURE 2 shows the manner in which the diodes of FIGURE 1 can be coupled by coupling reactors to force an equal current distribution between the diodes where the coupling chain is open.

FIGURE 3 is similar to FIGURE 2 where the chain of coupling reactors is closed.

FIGURE 4 shows another manner in which the chain of FIGURE 2 can be closed.

FIGURE 5 shows one of several laminations of a first portion of a lamination stack which performs the function of the individual reactors of FIGURE 3 where the lamination contains air gaps in accordance with my novel invention, and is interspersed among other laminations of identical design except without air gap.

FIGURE 6 shows the lamination of a second portion of a lamination stack, interspersed with similar laminations having no air gaps, the first and second portions forming the complete stack.

FIGURE 7 illustrates a top view of the laminations of FIGURES 5 and 6 in superposition.

FIGURE 8 is a schematic perspective view of the manner in which the lamination stack cooperates with the diode conductors, as shown in FIGURE 7.

FIGURE 9 shows the manner in which the lamination stack of FIGURE 8 can be supported from the rectifier bus structure, and is a cross-sectional view of FIGURE 10 taken across lines 9—9.

FIGURE 10 shows a cross-sectional view of FIGURE 9 taken across the lines 10—10.

FIGURE 11 illustrates a lamination for a second embodiment of my novel invention for sixteen parallel connected diodes.

Referring now to FIGURE 1, a single phase half-wave rectifier is shown therein to merely illustrate how a plurality of diodes are connected in parallel to achieve a particular current rating of a system. Thus, A.C. source 20 is connected to a D.C. load 22 through eight parallel connected diodes 24, 26, 28, 30, 32, 34, 36 and 38.

As is fully described in my copending application, Serial No. 628,324, filed December 14, 1956, now Patent No. 2,994,028, entitled "Current Balancing Reactors for Rectifier Elements," the forward current conducted by each of the diodes will be different in accordance with the forward conduction characteristic of each diode. Therefore, as seen in FIGURE 2, the conductors 40, 42, 44, 46, 48, 50, 52 and 54 associated with diodes 24, 26, 28, 30, 32, 34, 36 and 38 respectively are interconnected by coupling reactors which force equal current distribution between the diodes. More specifically, each adjacent pair of diode conductors are magnetically connected by coupling reactors 56, 58, 60, 62, 64, 66 and 68. Where conductors 40 and 42 are linked by reactor 56, conductors 42 and 44 are linked by reactor 58, conductors 44 and 46 are linked by reactors 60 and so on. The conductors of each pair are arranged to conduct current in opposite directions through their respective reactor, as indicated by the convention of a dot, indicating current flow out of the plane of the drawing and a cross indicating current flow into the plane of the drawing. Since the operation of the coupling reactors of the drawings is the subject matter of above noted application Serial No. 628,324, reference is made thereto for operational details.

FIGURE 2 shows the so-called open chain type of coupling for forcing equal current distribution between the diodes 24—38 associated with conductors 40—54 respectively. However, the chain may be closed, as shown in FIGURE 3, by a further coupling reactor 70 which couples conductors 54 and 40.

If there are an odd number of parallel connected diodes rather than the even number of FIGURES 1, 2 and 3, the chain may be closed as in FIGURE 4 by providing auxiliary reactors 72 and 74 for conductors 40 and 52 respectively where each of auxiliary reactors 72 and 74 have air gaps 76 and 78 respectively and windings 80 and 82 respectively. The chain is closed by connecting the windings 80 and 82 together with the start of one, indicated by the dot, connected to the finish of the other. It is to be noted that an open chain of an even number of diode conductors can be closed in the manner of FIGURE 4 where the starts of windings 80 and 82 are connected together. Clearly, many other types of closing a loop of even or odd numbers of diodes are available, the methods shown herein being for purposes of illustration.

FIGURES 5 through 8 illustrate the manner in which the coupling reactors can be formed by a stack of laminations. For illustrative purposes, the closed chain of FIGURE 3 is illustrated.

The lamination stack of FIGURE 8 is shown as comprised of a first portion 90 and a second portion 92. The laminations of the first portion 90 are illustrated in FIGURE 5 and comprise stamped laminations having openings 94, 96, 98 and 100 which receive diode conductor pairs 40—42, 44—46, 48—50, and 52—54 respectively. The laminations of the second portion 92 are illustrated in FIGURE 6 and comprise stamped laminations having openings 102, 104, 106 and 108 which receive diode conductor pairs 42—44, 46—48, 50—52 and 54—40 respectively.

The lamination portions 90 and 92, when assembled in the manner of FIGURES 7 and 8 will clearly provide magnetic coupling, as shown in FIGURE 3. That is, the conductors are surrounded by magnetic material in the same manner as if individual reactors were used. Thus, conductor 42 is magnetically coupled to adjacent conductor 40 through the lamination of FIGURE 5 and is also magnetically coupled to its other adjacent conductor 54 through the lamination of FIGURE 6. In a similar manner, each pair of adjacent diode conductors are linked to one another through a magnetic circuit.

In order to prevent local saturation of the lamination iron, and to increase the accuracy in equalizing the current in adjacent conductors, I have placed air gaps, or slots, in the laminations. Thus, in the lamination of FIGURE 5, a first and preferably large air gap 200 is cut across the full lamination. In a like manner, a cooperating air gap 202 is cut in the lamination of FIGURE 6. The air gaps 200 and 202 will prevent the undesired linking of oppositely positioned conductors such as 42 and 50. A smaller air gap is placed in the desired coupling paths to prevent saturation and reduced residual magnetization. Thus, in FIGURE 5, a single cut 206 is made through openings 94 and 96 of some of the laminations, while a similar cut 208 is made through openings 98 and 100 of the same laminations. These cuts will insert partial air gaps in the coupling circuits of the lamination. Thus, conductors 40 and 42 will be linked by a magnetic path including the air gap caused by cut 206 on either side of opening 94. In a like manner, each of conductor pairs 40—42, 48—50 and 52—54 will have air gaps in their magnetic circuit.

Similar cuts 210 and 212 are placed in some of the laminations of FIGURE 6. Thus, the magnetic circuit coupling conductors 40 and 54 will include a partial air gap formed by portions of cut 210 and 212.

As previously described, a cut through all the laminations will produce too large an air gap. Therefore, only a certain percentage of the laminations are provided with air gaps, and these are uniformly distributed throughout the stack so that each gap is flanked by an uncut lamination. Thus the magnetizing current is not greatly increased, but the residual magnetization is considerably reduced. By proper choice of proportion of cut and uncut laminations it is, therefore, possible to reduce the net unbalance between a given pair of coupled diodes.

It is to be noted that the cut stacks will be clamped by any desired type of clamping means. The clamping means has not been shown herein as it is not important in the understanding of the present invention.

The manner in which the laminations may be supported from the bus members is shown in FIGURES 9 and 10 for the case of the closed chain system of FIGURES 5, 6 and 7.

Referring now to FIGURES 9 and 10, the rectifier assembly is supported from a frame member 132 of insulating material. The frame 132 supports a first and second bus 134 and 136 which are bolted to frame 132 as by bolts 138 and 140 for bus 136 of FIGURE 9 and are positioned on nut plates 142, 144, 146 and 148. Buses 134 and 136 contain cooling conduits 135a—135b and 137a—137b respectively and support conductive diode receiving blocks such as blocks 150 through 156 for bus 136 and four similar blocks such as block 158 for bus 134.

Each of the diode receiving blocks as shown for block 158 of FIGURE 9 have tapped openings such as opening 160 for receiving their respective diode member, and is bolted to its nut plates by bolts similar to bolts 162 and 164.

The output bus is comprised of first and second elongated angle shaped members 166 and 168 which are positioned on and electrically connected by conductive bus 169 (FIGURE 9) and bolted to the frame 132 by bolts 171 and 173.

The current balancing reactor laminations are supported from the buses 166 and 168 by the diode conductors as will be shown hereinafter and are comprised of a first portion 170 corresponding to the laminations of FIGURE 5, and a second portion 172 corresponding to the laminations of FIGURE 6. The laminations are preferably insulated from the buses in any desired manner, and are clamped together in any desired manner.

Since the pairs of adjacent conductors to be magnetically coupled must pass through the laminations in opposite directions, all of the diode conductors in which current is to pass from right to left, or diodes 26, 30, 34 and 38 (see FIGURE 8) are connected to bus 136, while the other diodes 24, 28, 32 and 36 are connected to bus 134. Therefore, each of diodes 24, 28, 32 and 36, as specifically shown for diode 36 in FIGURE 10, is connected through a respective current limiting fuse (fuse 176 for diode 36) and then to diode conductor 52 which is insulated from bus 168 and the laminations 170 and 172 by insulating sleeve 178 and insulating spacer 180, and the diode conductor then is electrically connected to bus 166. In a similar manner, the remaining diodes 26, 30, 34 and 36 of bus 136 are electrically connected to bus 168, passing through and being insulated from the bus 166 and cores 170 and 172 by insulating structure such as insulating sleeves 182, 184 and 186 respectively.

In a similar manner, diode 26 being typical of diodes 26, 30, 34 and 38 is electrically connected through fuse 188 to bus bar 168 after passing through the cores 170 and 172. Note that conductor 42 of diode 26 is electrically insulated from bus 166 and laminations 170 and 172 by insulating sleeve 190 and insulating spacer 192.

From the foregoing, it is apparent that the lamination structure is supported from bus bars 166 and 168 by conductors 40, 42, 44, 46, 48, 50, 52 and 54 which pass through the lamination structure and are fastened to the buses. Accordingly, the structure is made extremely compact, accessible for maintenance, and is economical.

A further embodiment of my invention is shown in FIGURE 11. In the embodiment of FIGURE 11, 16 parallel diode conductors 220—250 respectively can be accommodated with current running in alternate directions as indicated. The single lamination of FIGURE 11 has apertures 262 through 276 which receive pairs of conductors as shown. As was the case for the laminations of FIGURE 8, large air gap 278 separates the two lines of apertures while end air gaps 280 and 282 isolate the end apertures 268 and 276 from the body of the lamination. The other section of the stack is similar in configuration to FIGURE 5, but receives 16 diode conductors.

The magnetic circuits of the conductors then have an air gap inserted therein by cuts 284, 288 and 290.

Although I have described preferred embodiments of my novel invention, many variations and modifications will now be obvious to those skilled in the art, and I prefer therefore to be limited not by the specific disclosure herein but only by the appended claims.

I claim:

1. A current balancing reactor means for a plurality of parallel connected diodes; said current balancing reactor means comprising a stack of magnetic laminations; each of said diodes having diode conductors extending therefrom; each of said diode conductors being positioned adjacent a first and second diode conductor of said diode conductors; each of said diode conductors and its said first adjacent conductor extending through a respective aperture in a first portion of said stack of magnetic laminations; each of said diode conductors and its said second adjacent diode conductor extending through a respective aperture in a second portion of said stack of magnetic laminations; each of said adjacent diode conductors carrying current in an opposite direction; each of said diode conductors terminating on a common bus conductor means; said apertures of said first and second portions of said stack of magnetic laminations being surrounded by a magnetic circuit having a region of increased reluctance to reduce saturation and the residual magnetization of the magnetic material.

2. A current balancing reactor means for a plurality of parallel connected diodes; said current balancing reactor means comprising a stack of magnetic laminations; each of said diodes having diode conductors extending therefrom; each of said diode conductors being positioned adjacent a first and second diode conductor of said diode conductors; each of said diode conductors and its said first adjacent conductor extending through a respective aperture in a first portion of said stack of magnetic laminations; each of said diode conductors and its said second adjacent diode conductor extending through a respective aperture in a second portion of said stack of magnetic laminations; each of said adjacent diode conductors carrying current in an opposite direction; each of said diode conductors terminating on a common bus conductor means; the magnetic circuit for each of said diode conductors extending through a common aperture including a relatively small air gap.

3. A current balancing reactor means for a plurality of parallel connected diodes; said current balancing reactor means comprising a stack of magnetic laminations; each of said diodes having diode conductors extending therefrom; each of said diode conductors being positioned adjacent a first and second diode conductor of said diode conductors; each of said diode conductors and its said first adjacent conductor extending through a respective aperture in a first portion of said stack of magnetic laminations; each of said diode conductors and its said second adjacent diode conductor extending through a respective aperture in a second portion of said stack of magnetic laminations; each of said adjacent diode conductors carrying current in an opposite direction; each of said diode conductors terminating on a common bus conductor means; the magnetic circuit for each of said diode conductors extending through a common aperture including a relatively small air gap; said relatively small air gap being formed by air gaps in a percentage of the laminations forming said first and second portion of said stack of magnetic laminations.

4. A current balancing reactor means for a plurality of parallel connected diodes; said current balancing reactor means comprising a stack of magnetic laminations; each of said diodes having diode conductors extending therefrom; each of said diode conductors being positioned adjacent a first and second diode conductor of said diode conductors; each of said diode conductors and its said first adjacent conductor extending through a respective aperture in a first portion of said stack of magnetic laminations; each of said diode conductors and its said second adjacent diode conductor extending through a respective aperture in a second portion of said stack of magnetic laminations; each of said adjacent diode conductors carrying current in an opposite direction; each of said diode conductors terminating on a common bus conductor means; the magnetic circuit for each of said diode conductors extending through a common aperture including a relatively small air gap; said relatively small air gap being formed by air gaps in a percentage of the laminations forming said first and second portion of said stack of magnetic laminations; said air gaps including a slot connecting the said apertures in said percentage of laminations.

5. A current balancing reactor means for a plurality of parallel connected diodes; said current balancing reactor means comprising a stack of magnetic laminations; each of said diodes having diode conductors extending therefrom; each of said diode conductors being positioned adjacent a first and second diode conductor of said diode conductors; each of said diode conductors and its said first adjacent conductor extending through a respective aperture in a first portion of said stack of magnetic laminations; each of said diode conductors and its said second adjacent diode conductor extending through a respective aperture in a second portion of said stack of magnetic laminations; each of said adjacent diode conductors carrying current in an opposite direction; each of said diode conductors terminating on a common bus conductor means; said bus conductor means being comprised of a first and second portion positioned adjacent a first and second face of said stack of magnetic laminations; alternately positioned diode conductors passing current through said stack in a first direction terminating at said first bus portion; the other of said diode conductors passing current through said stack in a direction opposite said first direction terminating at said second bus portion; the magnetic circuit for each of said diode conductors extending through a common aperture including a relatively small air gap.

6. A current balancing reactor means for a plurality of parallel connected diodes; said current balancing reactor means comprising a stack of magnetic laminations; each of said diodes having diode conductors extending therefrom; each of said diode conductors being positioned adjacent a first and second diode conductor of said diode conductors; each of said diode conductor and its said first adjacent conductor extending through a respective aperture in a first portion of said stack of magnetic laminations; each of said diode conductors and its said second adjacent diode conductor extending through a respective aperture in a second portion of said stack of magnetic laminations; each of said adjacent diode conductors carrying current in an opposite direction; each of said diode conductors terminating on a common bus conductor means; said bus conductor means being comprised of a first and second portion positioned adjacent a first and second face of said stack of magnetic laminations; alternately positioned diode conductors passing current through said stack in a first direction terminating at said first bus portion; the other of said diode conductors passing current through said stack in a direction opposite said first direction terminating at said second bus portion; the magnetic circuit for each of said diode conductors extending through a common aperture including a relatively small air gap; said relatively small air gap being formed by air gaps in a percentage of the laminations forming said first and second portion of said stack of magnetic laminations; said air gaps including a slot connecting the said apertures in said percentage of laminations.

7. A current balancing reactor means for a plurality of parallel connected diodes; said current balancing reactor means comprising a stack of magnetic laminations; each of said diodes having diode conductors extending therefrom; each of said diode conductors being positioned adjacent a first and second diode conductor of said diode conductors; said stack of magnetic laminations being comprised of a first and second portion; each of said first and second portions of said stack of magnetic laminations including a first and second row of apertures; each of said diode conductors and its said first adjacent diode conductor extending through a respective aperture of said first portion of said stack of laminations; each of said diode conductors and its said second adjacent diode conductor extending through a respective aperture of said second portion of said stack of magnetic laminations; each of said adjacent diode conductors carrying current in an opposite direction; each of said diode conductors being magnetically coupled through said stack of magnetic laminations; the magnetic circuit for each of said diode conductors extending through a common aperture including a relatively small air gap; said relatively small air gap being formed by air gaps in a percentage of the laminations forming said first and second portion of said stack of magnetic laminations.

8. A current balancing reactor means for a plurality of parallel connected diodes; said current balancing reactor means comprising a stack of magnetic laminations; each of said diodes having diode conductors extending therefrom; each of said diode conductors being positioned adjacent a first and second diode conductor of said diode conductors; said stack of magnetic laminations being comprised of a first and second portion; each of said first and second portions of said stack of magnetic laminations including a first and second row of apertures; each of said diode conductors and its said first adjacent diode conductor extending through a respective aperture of said first portion of said stack of laminations; each of said diode conductors and its said second adjacent diode conductor extending through a respective aperture of said second portion of said stack of magnetic laminations; each of said adjacent diode conductors carrying current in an opposite direction; each of said diode conductors being magnetically coupled through said stack of magnetic laminations; the magnetic circuit for each of said diode conductors extending through a common aperture including a relatively small air gap; said relatively small air gap being formed by air gaps in a percentage of the laminations forming said first and second portion of said stack of magnetic laminations; said air gaps including a slot connecting the said apertures in said percentage of laminations.

9. A current balancing reactor means for a plurality of parallel connected diodes; said current balancing reactor means comprising a stack of magnetic laminations; each of said diodes having diode conductors extending therefrom; each of said diode conductors being positioned adjacent a first and second diode conductor of said diode conductors; said stack of magnetic laminations being comprised of a first and second portion; each of said first and second portions of said stack of magnetic laminations including a first and second row of apertures; each of said diode conductors and its said first adjacent diode conductor extending through a respective aperture of said first portion of said stack of laminations; each of said diode conductors and its said second adjacent diode conductor extending through a respective aperture of said second portion of said stack of magnetic laminations; each of said adjacent diode conductors carrying current in an opposite direction; each of said diode conductors being magnetically coupled through said stack of magnetic laminations; said laminations being grain oriented in the direction of said rows of apertures.

10. A current balancing reactor means for a plurality of parallel connected diodes; said current balancing reactor means comprising a stack of magnetic laminations; each of said diodes having diode conductors extending therefrom; each of said diode conductors being positioned adjacent a first and second diode conductor of said diode conductors; said stack of magnetic laminations being comprised of a first and second portion; each of said first and second portions of said stack of magnetic laminations including a first and second row of apertures; each of said diode conductors and its said first adjacent diode conductor extending through a respective aperture of said first portion of said stack of laminations; each of said diode conductors and its said second adjacent diode conductor extending through a respective aperture of said second portion of said stack of magnetic laminations; each of said adjacent diode conductors carrying current in an opposite direction; each of said diode conductors being magnetically coupled through said stack of magnetic laminations; said laminations being grain oriented in the direction of said rows of apertures; the magnetic circuit for each of said diode conductors extending through a common aperture including a relatively small air gap; said relatively small air gap being formed by air gaps in a percentage of the laminations forming said first and second portion of said stack of magnetic laminations.

11. A first and second lamination for a current balancing reactor for balancing the current between parallel connected conductors; each of said first and second lamination containing a first and second aperture therein; each of said first apertures receiving a first conductor of said parallel connected conductors; each of said second apertures receiving a second conductor of said parallel connected conductors; said first aperture of said second lamination and said second aperture of said first lamination receiving a third conductor of said parallel connected conductors; said first and second apertures of each of said first and second laminations being spaced from one another; said first and second apertures of said first lamination being joined by an air gap.

12. The device as set forth in claim 11 wherein said second lamination is continuous.

References Cited in the file of this patent
UNITED STATES PATENTS

| | | |
|---|---|---|
| 400,515 | Thomson | Apr. 2, 1889 |
| 2,011,335 | Friedman | Aug. 13, 1935 |